E. HILL, Jr.
NAVIGATOR'S CALCULATING INSTRUMENT.
APPLICATION FILED APR. 8, 1909.

946,043.

Patented Jan. 11, 1910.

WITNESSES
Howard L. Holcomb
Josephine M. Strempfer

INVENTOR:
Ebenezer Hill Jr. by
Harry R. Williams
atty.

UNITED STATES PATENT OFFICE.

EBENEZER HILL, JR., OF NORWALK, CONNECTICUT.

NAVIGATOR'S CALCULATING INSTRUMENT.

946,043.  Specification of Letters Patent.  Patented Jan. 11, 1910.

Application filed April 8, 1909. Serial No. 488,553.

*To all whom it may concern:*

Be it known that I, EBENEZER HILL, Jr., a citizen of the United States, residing at Norwalk, in the county of Fairfield and State of Connecticut, have invented a new and useful Improvement in Navigators' Calculating Instruments, of which the following is a specification.

This invention relates to an instrument which is provided for the purpose of aiding a navigator in determining the actual compass course of a vessel.

The object of the invention is the production of an instrument which will indicate the variations of the compass needle from true north and south, the deviations of the needle due to local causes and ship influences, and the allowances made for wind and tide, and will point to the correct compass course, the computations of which are entirely obtained by simple mechanical manipulations of the various dials and pointers of the instrument.

This instrument provides a visible record of the allowance for variation, deviation, wind and tide, which may be quickly computed, and instantly read by any seaman capable of reading a compass card, and readily inspected and verified by any officer at a glance. The employment of this instrument economizes time, particularly when the courses are frequently changed, and the easterly or westerly deviation of the needle must be corrected for every course, and when, as often happens, the allowance for easterly or westerly variation must be corrected several times during a voyage; and avoids many arithmetical calculations for variation, deviation, wind and tide, involving addition and subtraction, with the incident chances of errors in signs, which may lead to serious mistakes and lamentable accidents.

Figure 1:
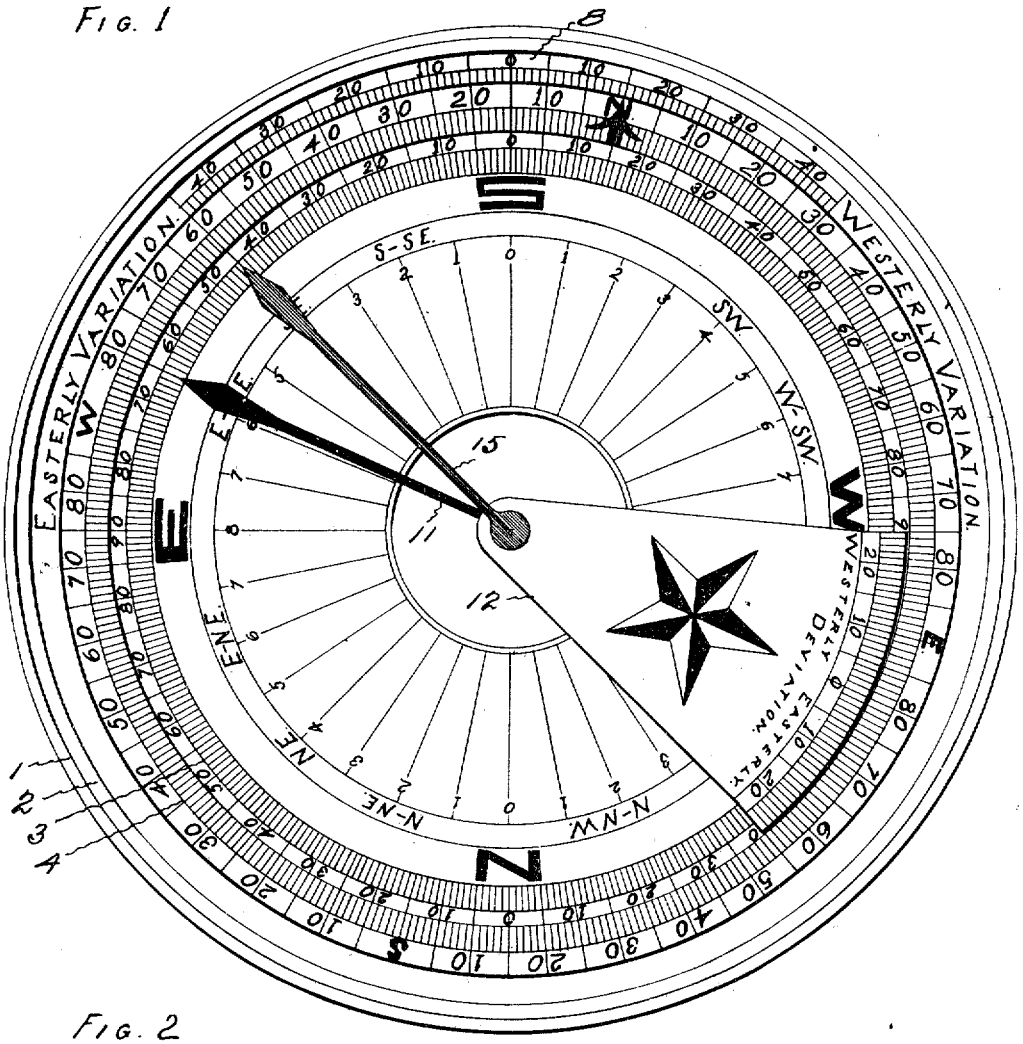
Figure 2:
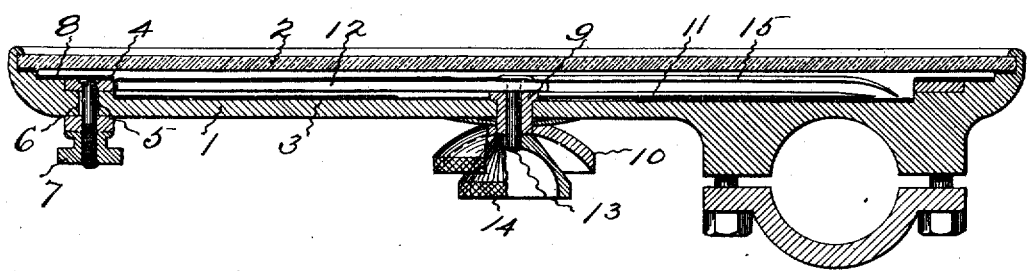

Figure 1 of the accompanying drawings shows a plan of an instrument which embodies this invention. Fig. 2 shows a diametrical section of the same.

The instrument shown, has a dish shaped case 1, which may be made of brass, or any other convenient material. Fastened over the top of the case is a cover 2, which is preferably plate glass, or some similar transparent material.

Secured to, or marked on, the inside of the bottom of the case is a dial, card or rose 3, which has the letters N. S. E. W., indicating the cardinal points of the compass. Inside of the circle with the cardinal letters, this fixed rose has letters, figures and lines indicating the minor points of the compass. Outside of the cardinal letters, the fixed rose is graduated and numbered to indicate the usual degrees of the compass.

Encircling the fixed rose, and loosely mounted on a slightly higher plane in the case, is a ring with an annular rose 4 having the letters N. S. E. W., indicating the cardinal compass points, and graduations and numbers indicating the usual degrees of the compass. This ring has a stud 5, which projects from its back through a slot 6 in the bottom of the case, and turning on the threaded end of this stud is a nut 7. When this nut is loosened, the ring may be rotated about 90 degrees, but when the nut is screwed up on the stud against the bottom of the case, the ring is held fast. The cardinal points on the movable annular rose are arranged reversely to the cardinal points on the fixed central rose, that is, N is adjacent to S, S is adjacent to N, E is adjacent to W, and W is adjacent to E.

Secured to or marked on the case, outside of the movable annular rose is a segmental rose 8, with graduations and figures indicating compass degrees from zero to 45 on each side of zero. On the left hand side of this outer fixed graduated arc or segmental rose, are the words "Easterly variation", and on the right hand side are the words "Westerly variation".

Extending through the center of the case, of the instrument illustrated, is a tubular arbor 9, which on its lower end has a finger piece 10, by which it may be turned. Projecting from this arbor over the fixed central rose, preferably to the degree graduations marked on that rose, is a needle or pointer 11, and upon the tail 12 of this pointer is a scale marked in degrees from zero, at the center, to 25 degrees on each side. The degrees on this tail on one side of zero are marked "Westerly deviation", and on the other side "Easterly deviation."

In the form of instrument shown, there is an arbor 13, extending through the tubular arbor at the center. This arbor has a finger piece 14, by which it may be turned, on its outer end, and a pointer 15 on its inner end. The pointers are desirably different colors, preferably black and red, so that they may be readily distinguished.

In using this instrument, the movable ring with the annular compass rose is loosened and turned until its needle point or N, is opposite the degree on the outer scale, or segmental rose, corresponding to the known "westerly" or "easterly variation" as the case may be, of the compass needle from the true north, which degree is taken from the data given on the navigation charts. For example, if the compass needle, at the time, varies 15 degrees "westerly", the needle point, or N, of the movable annular compass rose is moved opposite to the degree indicating 15 degrees "westerly variation", as shown in Fig. 1. After the movable compass rose is fastened in this position, by tightening the nut on the bottom of the instrument, the movable pointer 11, if there is no deviation due to local causes aboard ship, is turned by the finger piece on the back, until the zero point on its tail is opposite the degree on the now fixed annular rose, which indicates the desired true course, as determined from the chart. If there is no deviation, and the true course is east, zero on the tail is turned opposite to E, on the annular rose, which has been adjusted to allow for the required variation. Under these circumstances, the needle to which the tail piece is attached, points to " S. 75 degrees E " on the fixed central rose. If there is a westerly deviation of 10 degrees, the degree marked 10 degrees westerly deviation upon the tail piece is moved opposite to E, of the annular compass rose, and then we read from the point of the needle 11 on the fixed central compass rose, the compass course " S 65 degrees E ", as shown in the drawing. If the known course is such that besides the allowances for variation and deviation, allowance must be made for tide, or the influence of wind, the pointer 15, which is preferably red, is then adjusted either side of the magnetic course, as indicated by the black pointer, to indicate the allowance in degrees thus to be made for tide and wind. This red pointer is then the one from which the helmsman reads the course to follow.

The invention claimed is:

1. A navigator's calculating instrument, having a case with a fixed central compass rose, a movable annular compass rose encircling the fixed rose, a fixed variation scale outside of the annular rose, a pointer movable over the fixed central rose, and a deviation scale carried by the tail of the pointer and movable adjacent to the graduations on the annular rose.

2. A navigator's calculating instrument, having a case with a fixed central compass rose, a movable annular compass rose encircling the fixed rose, a fixed variation scale outside of the annular rose, a pointer movable over the fixed central rose, a deviation scale carried by the tail of said pointer and movable adjacent to the graduations on the annular rose, and a second pointer movable over the fixed rose.

3. A navigator's calculating instrument having a case with a fixed central compass rose, an annular compass rose movable on the case at a higher level than the central compass rose which it encircles, a variation scale fixed to the case outside of the annular rose, a pointer supported by the case and movable over the fixed rose, and a segment fastened to and movable with the pointer on a plane substantially the same as that of the annular rose, said segment having a deviation scale movable in proximity to the graduations of the annular rose.

4. A navigator's calculating instrument having a case, a fixed central compass rose, an annular compass rose encircling the fixed rose, a stud projecting from the back of the annular rose through the bottom of the case, a clamp nut for moving and fastening the annular rose, a variation scale fixed to the case outside of the annular rose, a spindle extending through the bottom of the case, a pointer fastened to the spindle and movable over the fixed rose, a segment mounted on the spindle, said segment having a deviation scale movable adjacent to the graduations of the annular rose, and means attached to the bottom end of the spindle for turning the same.

5. A navigator's calculating instrument having a case, a fixed central compass rose, an annular compass rose encircling the fixed rose, a stud projecting from the back of the annular rose through the bottom of the case, a clamp nut for moving and fastening the annular rose, a variation scale fixed to the case outside of the annular rose, a spindle extending through the bottom of the case, a pointer fastened to the spindle and movable over the fixed rose, a segment mounted on the spindle, said segment having a deviation scale that is movable adjacent to the graduations of the annular rose, means attached to the bottom end of the spindle for turning the same, a spindle extending through the first mentioned spindle, means on the lower end of the central spindle for turning the same, and a pointer fastened to the upper end of the central spindle and movable over the fixed rose.

6. A navigator's calculating instrument, having a case with a fixed central compass rose, a movable annular compass rose encircling the fixed rose, means for moving the annular rose about the central rose, a pointer movable over the central rose, and a segmental deviation scale carried by the tail of the pointer and movable adjacent to the graduations on the annular rose.

EBENEZER HILL, JR.

Witnesses:
H. R. WILLIAMS,
JOSEPHINE M. STREMPFER.